United States Patent
Dishon et al.

(10) Patent No.: US 10,264,440 B2
(45) Date of Patent: Apr. 16, 2019

(54) APPARATUS AND METHOD FOR RAPID ELECTRONIC DEVICE DISCOVERY

(71) Applicant: Raytheon BBN Technologies Corp., Cambridge, MA (US)

(72) Inventors: John Dishon, San Diego, CA (US); Joshua N. Edmison, Ellicott City, MD (US); John-Francis Mergen, Baltimore, MD (US); Zachary Leuschner, Annapolis, MD (US); Kerry Wood, Elkridge, MD (US); Laurie Waisel, Columbia, MD (US); Richard Burne, Ellicott City, MD (US); Tyler Shake, Baltimore, MD (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 98 days.

(21) Appl. No.: 15/362,121

(22) Filed: Nov. 28, 2016

(65) Prior Publication Data
US 2017/0289786 A1    Oct. 5, 2017

Related U.S. Application Data

(63) Continuation-in-part of application No. 15/259,760, filed on Sep. 8, 2016.
(Continued)

(51) Int. Cl.
*H04W 8/00* (2009.01)
*H04W 8/22* (2009.01)
(Continued)

(52) U.S. Cl.
CPC ............ *H04W 8/005* (2013.01); *H04B 17/27* (2015.01); *H04L 63/302* (2013.01); *H04W 8/22* (2013.01); *H04W 12/02* (2013.01); *H04B 17/30* (2015.01)

(58) Field of Classification Search
CPC ....................................................... H04B 1/16
(Continued)

(56) References Cited

U.S. PATENT DOCUMENTS

| 5,491,631 | A | 2/1996 | Shirane et al. |
| 7,941,248 | B1 * | 5/2011 | Tsamis ................. G08G 5/0013 |
| | | | 701/3 |

(Continued)

OTHER PUBLICATIONS

Remya et al., GNU Radio Based BIST for SDR Performance Measurement, 2014, IEEE, 978-1-4799-5958-7114/$31.00 (Year: 2014).*

(Continued)

*Primary Examiner* — Carlos Garcia
(74) *Attorney, Agent, or Firm* — Schwegman Lundberg & Woessner, P.A.

(57) ABSTRACT

An apparatus, method, and computer program product that intentionally illuminate at least one target device with electromagnetic energy having specific characteristics (e.g., frequency, power, waveform, directionality, duration, etc.). The target device, which may be an unpowered data storage device, acts as a non-linear mixer and is forced to emit radiative signals containing information about the target device behavior, state, and physical characteristics. Embodiments receive the forced emissions, extract useful data, and analyze the data to determine target device characteristics (e.g., a target device type, based on a comparison of data from known types). Embodiments control the illumination so the forced emissions radiate from an enclosure without interfering with tactical communications, and so that stored (Continued)

target device data is not affected. Embodiments can locate a hidden target device via the strength and directionality of the forced emissions. The apparatus is portable for use by military, intelligence, and security personnel.

17 Claims, 7 Drawing Sheets

Related U.S. Application Data

(60) Provisional application No. 62/316,913, filed on Apr. 1, 2016.

(51) Int. Cl.
| | |
|---|---|
| H04B 1/00 | (2006.01) |
| H04B 17/27 | (2015.01) |
| H04L 29/06 | (2006.01) |
| H04W 12/02 | (2009.01) |
| H04B 17/30 | (2015.01) |

(58) Field of Classification Search
USPC .................................................. 340/10.1
See application file for complete search history.

(56) References Cited

U.S. PATENT DOCUMENTS

| | | | |
|---|---|---|---|
| 9,740,975 B2 | 8/2017 | Gibson et al. | |
| 10,121,294 B1 | 11/2018 | Dishon et al. | |
| 2003/0158954 A1* | 8/2003 | Williams | H04L 29/06 709/230 |
| 2005/0128074 A1* | 6/2005 | Culpepper | G08B 21/0269 340/539.1 |
| 2010/0056207 A1* | 3/2010 | Yang | H04B 17/23 455/556.1 |
| 2010/0097187 A1 | 4/2010 | Hill | |
| 2010/0112954 A1* | 5/2010 | Son | H04K 3/822 455/67.7 |
| 2011/0061605 A1 | 3/2011 | Hardi et al. | |
| 2013/0056532 A1* | 3/2013 | Hasegawa | G07G 1/0063 235/375 |
| 2014/0214263 A1 | 7/2014 | Boucher et al. | |
| 2015/0102105 A1 | 4/2015 | Perret et al. | |
| 2015/0120578 A1 | 4/2015 | Roddy et al. | |
| 2015/0186695 A1 | 7/2015 | Hill | |
| 2016/0013657 A1 | 1/2016 | Jeong et al. | |
| 2017/0288788 A1 | 10/2017 | Dishon et al. | |
| 2017/0288789 A1 | 10/2017 | Dishon et al. | |
| 2018/0150344 A1 | 5/2018 | Kim et al. | |

OTHER PUBLICATIONS

Mashkov et al., Experimental Validation of Multipoint Joint Processing of Range Measurements via Software-Defined Radio Testbed, Jan. 31-Feb. 3, 2016, ICACT2016, ISBN 978-89-968650-6-3, pp. 268-273 (Year: 2016).*

Kimionis et al., Design and Implementation of RFID Systems with Software Defined Radio, 2011, IEEE, 6th European Conference on Antennas and Propagation (EUCAP), 978-1-4577-0919-7/12/$26.00, pp. 3464-3468 (Year: 2011).*

Yeste-Ojeda et al., Software Defined Radio Approach to Distance Measuring Equipment, 2014, IEEE, 978-1-4799-3320-4/14/$31.00, pp. 680-685 (Year: 2014).*

Sbir Investments in Software Defined Radio Technology, 2012, NASA (Year: 2012).*

José Raúl Machado-Fernandez, Software Defined Radio: Basic Principles and Applications, Sep. 29, 2014, Revista Facultad de Ingeniería, vol. 24. No. 38. pp. 79-96, ISSN 0121-1129, eISSN 2357-5328 (Year: 2015).*

Joseph M. Jacob, The next advancements in Software-Defined Radio, Summer 2006, Reprinted from Military Embedded Systems (Year: 2006).*

Huang et al., A Hands-on Project for Avionics Systems Course in Aviation Engineering Technology Program, 2018, American Society for Engineering Education, Paper ID #21075 (Year: 2018).*

Charlotte Adams, SDR Takes Flight, Feb. 1, 2013, Aviation Today, https://www.aviationtoday.com/2013/02/01/sdr-takes-flight/ (Year: 2013).*

"U.S. Appl. No. 15/676,518, Examiner Interview Summary dated Apr. 9, 2018", 3 pgs.

"U.S. Appl. No. 15/676,518, Non Final Office Action dated Dec. 28, 2017", 12 pgs.

"GNU Radio Website", WaybackMachine: www.gnuradio.org, (Nov. 2015), 4 pgs.

"NSA TEMPEST Documents", [Online]. Retrieved from the Internet: <URL: https://cryptome.org/nsa-tempest.htm>, (Accessed Oct. 30, 2015), 2 pgs.

"Ramsey RF Shielded Test and Forensics Enclosures", Ramseytest.com—Nov. 2015, (Oct. 26, 2015), 2 pgs.

Agrawal, Dakshi, et al., "Multi-channel Attacks", Cryptographic Hardware and Embedded Systems—CHES 2003, vol. 2779, (2003), 2-16.

Agrawal, Dakshi, et al., "The EM Side-Channel(s)", Cryptographic Hardware and Embedded Systems—CHES 2002, vol. 2523, (2002), 29-45.

Agrawal, Dakshi, et al., "The EM Side-Channel(s): Attacks and Assessment Methodologies", Proceedings of the 4th International Workshop on Cryptographic Hardware and Embedded Systems, (2002), 1-42.

Batina, Lejla, et al., "Mutual Information Analysis: A Comprehensive Study", J. Cryptol., vol. 24, No. 2, (Apr. 2011), 269-291.

Bayrak, Ali, et al., "First Step Towards Automatic Application of Power Analysis Countermeasures", Proceedings of the 48th Design Automation Conference, (2011), 230-235.

Callan, Robert, et al., "A Practical Methodology for Measuring the Side-Channel Signal Available to the Attacker for Instruction-Level Events", Proceedings of the 47th Annual IEEE/ACM International Symposium on Microarchitecture (MICRO), (Dec. 2014), 242-254.

Callan, Robert, et al., "Comparison of Electromagnetic Side-Channel Energy Available to the Attacker from Different Computer Systems", IEEE International Symposium on Electromagnetic Compatibility (EMC),, (2015), 219-223.

Callan, Robert, et al., "FASE: Finding Amplitude-modulated Side-channel Emanations", Proceedings of the 42nd Annual International Symposium on Computer Architecture, (2015), 592-603.

Clark, Shane, "The Security and Privacy Implications of Energy—Proportional Computing (Dissertations. Paper 782)", University of Massachusetts Amherst, (2013), 125 pgs.

Compston, James, et al., "A Fundamental Limit on Antenna Gain for Electrically Small Antennas", IEEE 2008 Sarnoff Symposium, (2008), 1-5.

Cui, Ang, "A Quantitative Analysis of the Insecurity of Embedded Network Devices: Results of a Wide-Area Scan", Proceedings of the 26th Annual Computer Security Applications Conference, (2010), 97-106.

Dasilva, Luiz, et al., "Requirements of an Open Platform for Cognitive Networks Experiments", 3rd IEEE Symposium on New Frontiers in Dynamic Spectrum Access Networks, (2008), 1-8.

Del Pozo, Santos, et al., "Blind Source Separation from Single Measurements Using Singular Spectrum Analysis", Cryptographic Hardware and Embedded Systems—CHES 2015, vol. 9293, (2015), 42-59.

Dysart, Paul, et al., "Regional Seismic Event classification at the NORESS array: Seismological Measurements and the Use of Trained Neural Networks", Bull. Seismol. Soc. Am., vol. 80, No. 6B, (Dec. 1990), 1910-1933.

Gandolfi, Karine, et al., "Electromagnetic Analysis: Concrete Results", Cryptographic Hardware and Embedded Systems—CHES 2001, vol. 2162, (2001), 251-261.

Gierlichs, Benedikt, et al., "Mutual Information Analysis: A Generic Side-Channel Distinguisher", Cryptographic Hardware and Embedded Systems—CHES 2008, vol. 5154, (2008), 426-442.

(56) References Cited

OTHER PUBLICATIONS

Hastie, T, et al., "", The Elements of Statistical Learning, Springer New York, (2009), 763 pgs.

Kim, Tae Hyun, et al., "Side channel analysis attacks using AM demodulation on commercial smart cards with SEED", The Journal of Systems and Software 85 (12), (Dec. 2012), 2899-2908.

Knight, John, et al., "Automated Classification of Active Acoustic Returns", Radix Systems, Inc., (Apr. 9, 1993), 16 pgs.

Kocher, Paul, et al., "Introduction to differential power analysis", J. Cryptogr. Eng., vol. 1, No. 1, (Apr, 2011), 5-27.

Kuhn, Markus, "Security Limits for Compromising Emanations", Cryptographic Hardware and Embedded Systems—CHES 2005, vol. 3659, (2005), 265-279.

Lakshminarayanan, Kaushik, et al., "RFDump: An Architecture for Monitoring the Wireless Ether", Proceedings of the 5th International Conference on Emerging Networking Experiments and Technologies, (2009), 253-264.

Li, Huiyun, et al., "Security Evaluation Against Electromagnetic Analysis at Design Time", Cryptographic Hardware and Embedded Systems—CHES 2005, vol. 3659, (2005), 280-292.

Meynard, Olivier, et al. "Enhancement of Simple Electro-Magnetic. Attacks by Pre-characterization in Frequency Domain and Demodulation Techniques", Design, Automation Test in Europe Conference Exhibition, (2011), 1-6.

Montminy, D P, "Enhancing Electromagnetic Side-Channel Analysis in an Operational Environment (Dissertation)", Air Force Institute of Technology, (Sep. 2013), 247 pgs.

Muccioli, J P, et al., "Characterization of the RF Emissions from a family of microprocessors using a 1 GHz TEM cell", IEEE 1997 International Symposium on Electromagnetic Compatibility (1997), 203-207.

Muccioli, J P, et al,, "Investigation of the theoretical basis for using a 1 GHz TEM cell to evaluate the radiated emissions from integrated circuits", IEEE 1996 International Symposium on Electromagnetic Compatibility, 1996. Symposium Record., (1996), 63-67.

Oliphant, T. E., "Python for Scientific Computing", Comput. Sci. Eng., vol. 9, No. 3, (May 2007), 10-20.

O'Shea, Timothy, et al., "Practical Signal Detection and Classification in GNU Radio", SDR Forum Technical Conference, (2007), 6 pgs.

Pedregosa, F, et al., "Scikit-learn: Machine Learning in Python", J Mach Learn Res, vol. 12, (Nov. 2011), 2825-2830.

Peeters, Eric, et al., "Power and electromagnetic analysis: Improved model, consequences and comparisons", Integr. VLSI J., vol. 40, No. 1, (Jan. 2007), 52-60.

Pulli, Jay, "Analysis of the Jan. 2015 Plainfield, CT Earthquake Sequence Using Waveform Correlation Techniques", Presented at the 87th Annual Meeting Eastern Section Seismological Society of America, University of Memphis., (Oct. 7, 2015), 18 pgs.

Pulli, Jay, "Instantaneous Power Calculations for the Patrick Alpha Acoustic Projector", Analysis Staff Technical Memorandum, (Sep. 5, 1989), 19 pgs.

Quisquater, J J, et al. "ElectroMagnetic Analysis (EMA): Measures and Counter-measures for Smart Cards", Smart Card Programming and Security, vol. 2140, (2001), 200-210.

Sarihari, Mohd Adib, et al., "Energy Detection Sensing based on GNU Radio and USRP: An Analysis Study", IEEE 9th Malaysia International Conference on Communications (MICC), (2009), 338-342.

Sharan, Ravi, et al., "The Comprehensive GNU Radio Archive Network", [Online]. Retrieved from the Internet: <URL: http://www.cgran.org/ >, (Nov. 2015), 5 pgs.

Van Der Walt, S, et al., "The NumPy Array: A Structure for Efficient Numerical Computation", Comput. Sci. Eng., vol. 13, No. 2, (Mar. 2011), 22-30.

Vuagnoux, Martin, et al., "An Improved Technique to Discover Compromising Electromagnetic Emanations", IEEE International Symposium on Electromagnetic Compatibility (EMC), (2010), 121-126.

Vuagnoux, Martin, et al., "Compromising Electromagnetic Emanations of Wired and Wireless Keyboards", USENIX security symposium, (2009), 1-16.

Zajic, Alenka, et al., "Experimental Demonstration of Electromagnetic Information Leakage from Modern Processor-Memory Systems", IEEE Trans. Electromagn. Compat., vol. 56, No. 4, (Aug. 2014), 885-893.

"U.S. Appl. No. 15 676,518 Response filed Apr. 30, 2018 to Non Final Office Action dated Dec. 28, 2017", 10 pgs.

Flintoff, Ian D., et al., "The Re-Emission Spectrum of Digital Hardware Subjected to EMI", IEEE Transactions on Electromagnetic Compatibility, vol. 45, No. 4,, (Nov. 2003), 11 pgs.

Vick, Ralf, et al., "The Dependence of the Immunity of Digital Equipment on the Hardware and Software Structure", (1997), 383-386.

"U.S. Appl. No. 15/259,760, Non Final Office Action dated Jun. 20, 2018", 12 pgs.

"U.S. Appl. No. 15/375,834, Non Final Office Action dated Jun. 22, 2018", 19 pgs.

Richard, Linhart, et al., "Measuring RF Circuits Response Using Software Defined Radio System", IEEE, Print ISBN: 978-8-0261-0276-2, (Jan. 19, 2015).

Shaw, et al., "Software Defined Radio as a solution to testing RF avionics", IEEE, Electronic ISBN: 978-1-4799-3005-0, (Sep. 15-18, 2014).

U.S. Appl. No. 16/193,713, filed Nov. 16, 2018, Operating General Purpose Hardware as Radio.

"U.S. Appl. No. 15 676,518, Notice of Allowance dated Jun. 12, 2018", 10 pgs.

"U.S. Appl. No. 15/259,760, Response filed Oct. 15, 2018 to Non-Final Office Action dated Jun. 20, 2018", 9 pgs.

"U.S. Appl. No. 15/375,834, Response filed Oct. 15, 2018 to Non-Final Office Action dated Jun. 22, 2018", 9 pgs.

* cited by examiner

FIG. 1 REPRESENTATIVE INJECTION/ILLUMINATION LOCATIONS

EXPERIMENTAL SETUP

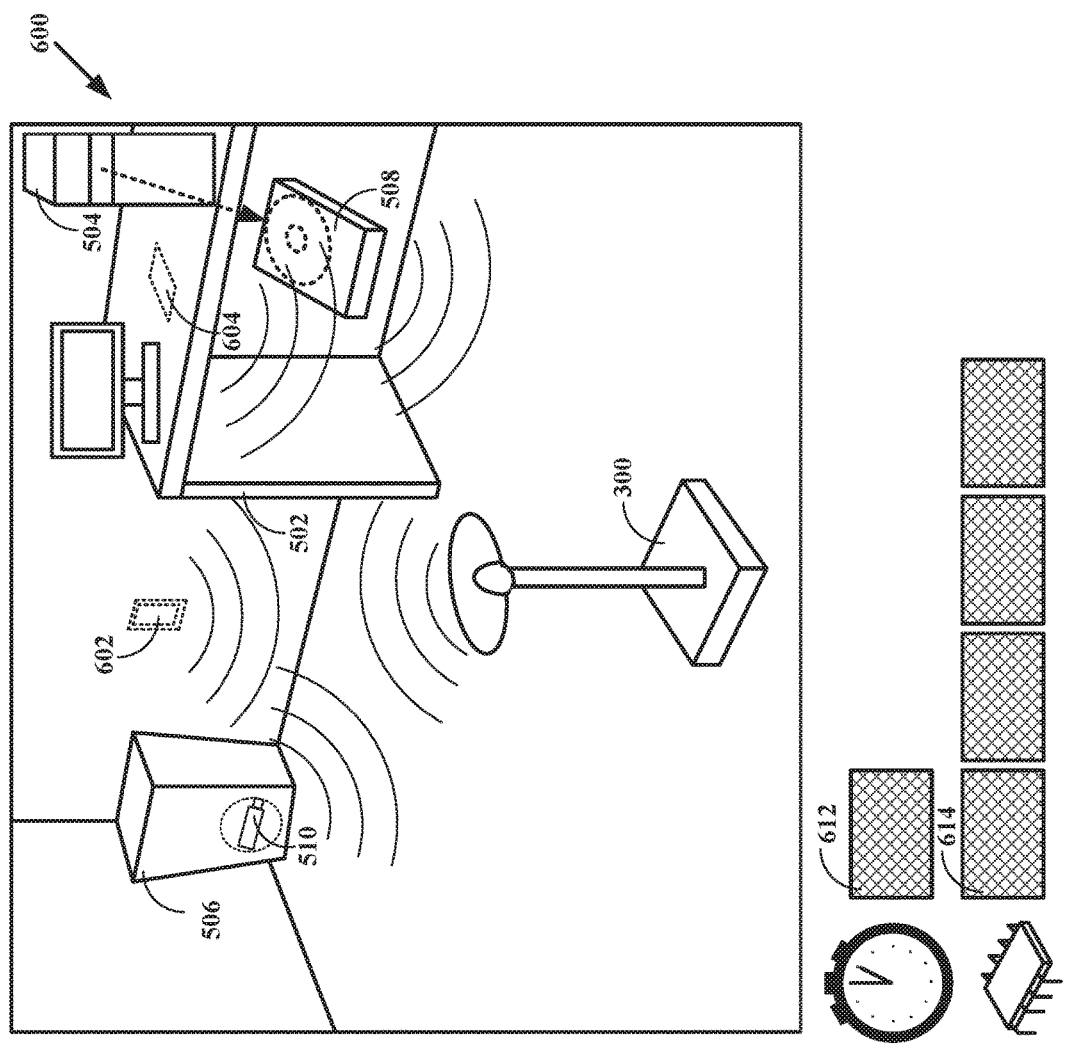

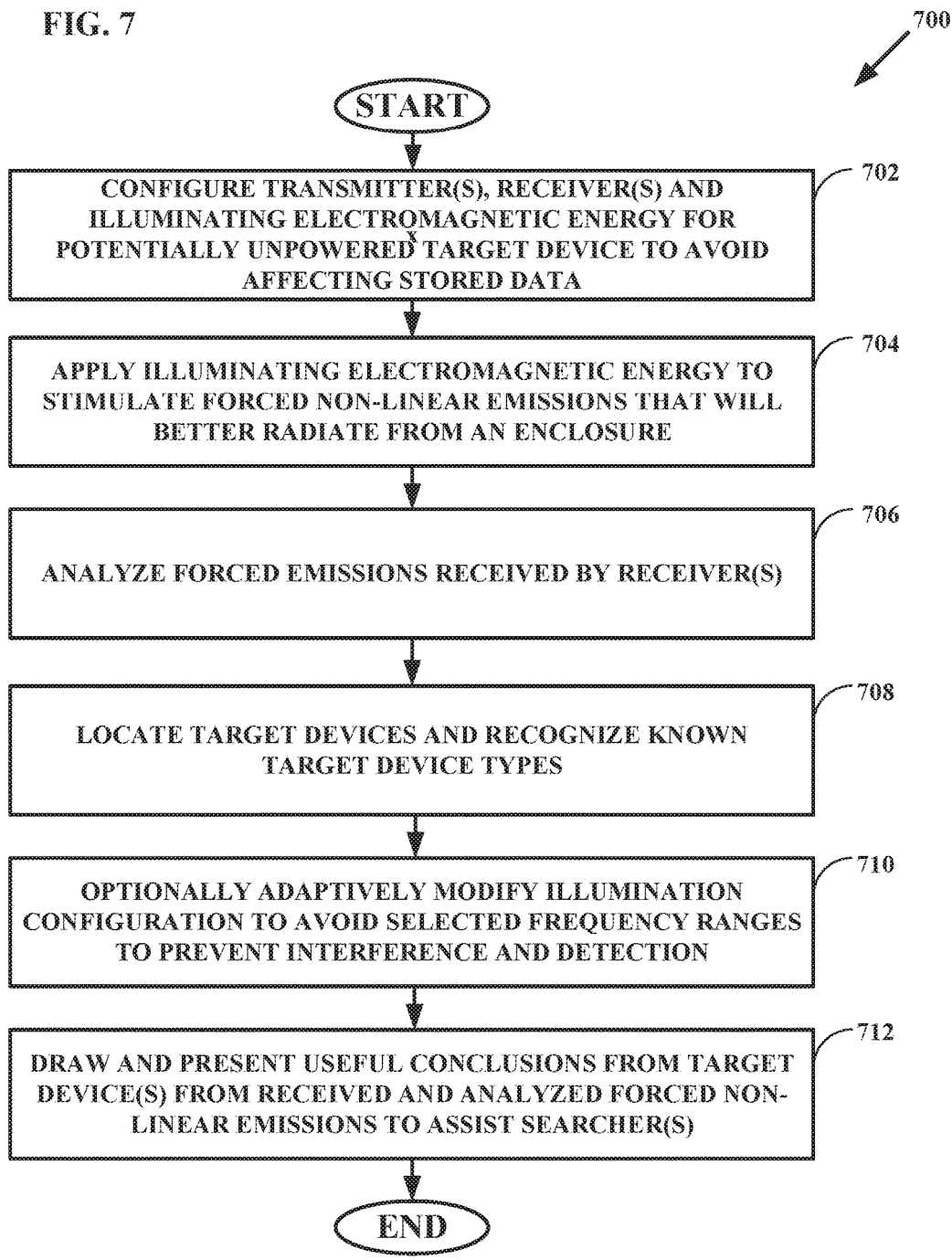

APPARATUS AND METHOD FOR RAPID ELECTRONIC DEVICE DISCOVERY

RELATED APPLICATIONS

This application is a continuation-in-part of application U.S. Ser. No. 15/259,760 entitled "Apparatus And Method For Remote Analysis Of A Target Device", filed on Sep. 8, 2016, which is hereby incorporated by reference in its entirety and which claims the priority benefit of provisional application U.S. Ser. No. 62/316,913 entitled "Forced Non-Linear Emissions", filed on Apr. 1, 2016, which is also hereby incorporated by reference in its entirety.

TECHNICAL FIELD

Embodiments pertain to measurement and signal intelligence (MASINT). Some embodiments pertain to the apparatus and methods for, and the data obtained from illuminating target devices with intentional radio frequency (RF) energy and observing resulting responses and behaviors.

BACKGROUND

Over at least the past thirty-five years there has been a continuing interest in the ability to sense what computing systems are doing from afar. A number of methods have been explored, including receiving inadvertent radio emissions, visible light examination, magnetic sensing, temperature sensing, multispectral analysis, and acoustic sensing. All of the previous methods have been limited in a combination of precision, range, and general applicability. Known methods for observing target device characteristics and behavior during operation require some combination of software and/or hardware resident on the target device, knowledge of target device communication protocols and modalities, and/or close physical access to the target device. Current and past techniques thus require substantial a priori knowledge, are potentially invasive to target device operation, and are susceptible to erroneous or even malicious activities on the target device.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 6 shows an example of an electromagnetically scanned target device search area 600 in accordance with some embodiments.

FIG. 7 shows a further example of a forced non-linear emission method 700 in accordance with some embodiments.

DETAILED DESCRIPTION

The present inventors have recognized, among other things, that particular improvements of the apparatus and methods used for detecting and analyzing remotely located target devices, such as computing systems and portable data storage media, are possible and would enable specific distinct advantages.

The inventive examples described below may address the shortcomings of previous efforts and enable advantageous remote sensing and characterization of a target device or system. This disclosure describes systems and methods for characterizing, observing, and measuring target devices from a standoff distance limited only by the ability to place RF energy on the target devices and properties of the target devices. The solution provided requires no a priori knowledge of devices, may be tailored to avoid impacting target device operation and data storage, does not require physical access to the target device, and does not require software/hardware on the target device itself. The disclosed examples leverage the analog properties of a target device, present in both analog and digital elements, to extract useful information about the target device.

The examples described make novel use of involuntary analog emissions from all classes of target devices to enhance cyber defense. This approach may exploit the signal content of forced electromagnetic (EM) emissions from illuminated target devices. The non-linear properties of the forced emissions enable circumvention of shielding and greatly decrease the likelihood of a target device, including both its software and hardware, manipulating the measurements. The solution provided thus enables assessment of the operations of many heterogeneous target devices remotely and efficiently.

The exemplary apparatus may comprise illumination devices or transmitter circuits for producing electromagnetic energy, and receiver devices or circuits for receiving forced emissions. The methods may extract the key re-emission signals from noise, and analyze the resulting signal data for behaviors. The data obtained may enable defense contractors to assess reemission characteristics of military systems, allow civilian consumers to monitor their home devices, and enable businesses to monitor their enterprises. Similarly, target devices may be detected, located, and characterized by military, security, and intelligence personnel more rapidly and thoroughly than is possible via visual inspection alone.

Figure 1:
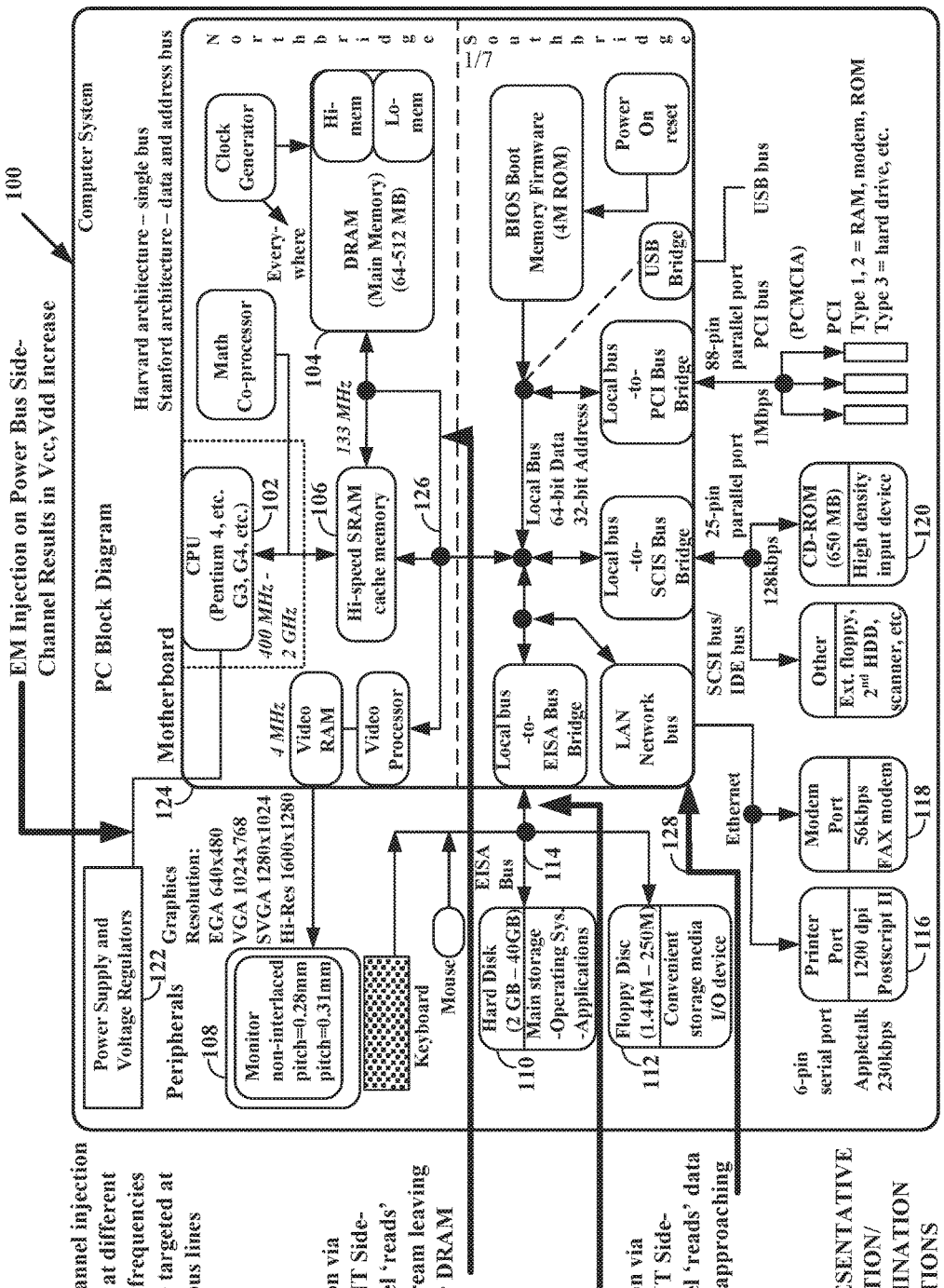
FIG. 1 shows an example of a target device 100 in accordance with some embodiments.

FIG. 1 shows an example of a target device 100 in accordance with some embodiments. In this example, the target device is a personal computer (pc) system, though many other types of electronic circuits may also be investigated via the forced emission approach, including cell phones, pagers, and other consumer electronic devices, as well as avionics systems. The disclosure is not limited in this respect, however.

The target device 100 may comprise a variety of components that each may operate at a given clock frequency or data transfer rate. For example, a central processing unit (CPU) 102 may be the highest speed component in the target device, with a clock speeds often between 400 MHz and two GHz. Memory systems 104 and 106 may transfer data to and from the CPU 102 at a somewhat lower speed that may depend on the bandwidth of pc board traces, e.g., 133 MHz.

The target device 100 may generate video data for display on a monitor 108, with data rates of perhaps four MHz.

Each of these devices may transfer data over pathways that use known frequency ranges. Primary data storage devices such as a hard disk drive 110 or a floppy disc unit 112 may communicate with the CPU 102 via an interface bus 114, such as the well-known EISA personal computer bus. Peripheral devices that provide data transfer are also familiar to one of ordinary skill in the art of computer systems. Printers 116, modems 118, scanners, mice, keyboards, CD-ROM drives 120, and PCMCIA cards for example often use standardized interfaces that may operate at known data exchange rates or at least identifiable ranges thereof.

As shown in FIG. 1 in bold, electromagnetic energy may be injected into the target device 100 through various channels. For example, the connection between a target device's power supply 122 and a main motherboard 124 may receive intentionally applied illumination. The result may be that the normally regulated supply voltages provided to power the various components of the target device 100 may be altered. The incoming illumination or electromagnetic radiation may be distributed throughout the target device 100 via the power supply network.

The externally generated illumination may also be injected via primary interface bus 126 and peripheral interface buses 114 and 128, as also shown in bold. The applied electromagnetic energy may mix with signals transferring to and from the CPU 102, producing forced non-linear emissions that radiate away. In one example, the forced non-linear emissions may radiate from one or more antennas of the target device, although the disclosure is not limited in this respect. The forced emissions may be analyzed to determine the signals that were transferring to and from the CPU 102.

The present inventors have recognized that applications of the embodiments provided are not limited to powered, operational target devices 100. For example, detection and analysis of portable unpowered data storage devices may be particularly useful. These target devices 100 may store data with little or no power being provided to generate any internal operational signals, except when the data is actually being read, written, modified, or deleted. Many such data storage devices use so-called flash memory for example, which generally refers to a class of non-volatile storage technology based on the presence or absence of electrical charges trapped in an isolated insulator structure. Widely available non-limiting examples of flash memory data storage devices include SIM cards, USB memory sticks, and SD cards.

SIM is an acronym of "subscriber identification module," a type of integrated circuit used to securely store an identifier, a related cryptographic security key, and sometimes contact information for users of cell phones, for example. SIM cards are generally portable between different mobile devices, which may each use a different telephony format for different geographic regions. USB is an acronym of "universal serial bus," an industry standard interface for consumer electronic devices. A USB memory stick, also known as a "flash drive" or "thumb drive," is generally a portable flash memory based storage device with a USB interface. An SD ("secure digital") card is an industry standard flash memory based storage device, available in a variety of form factors, most often used in digital cameras for storing images and video data.

Figure 2:
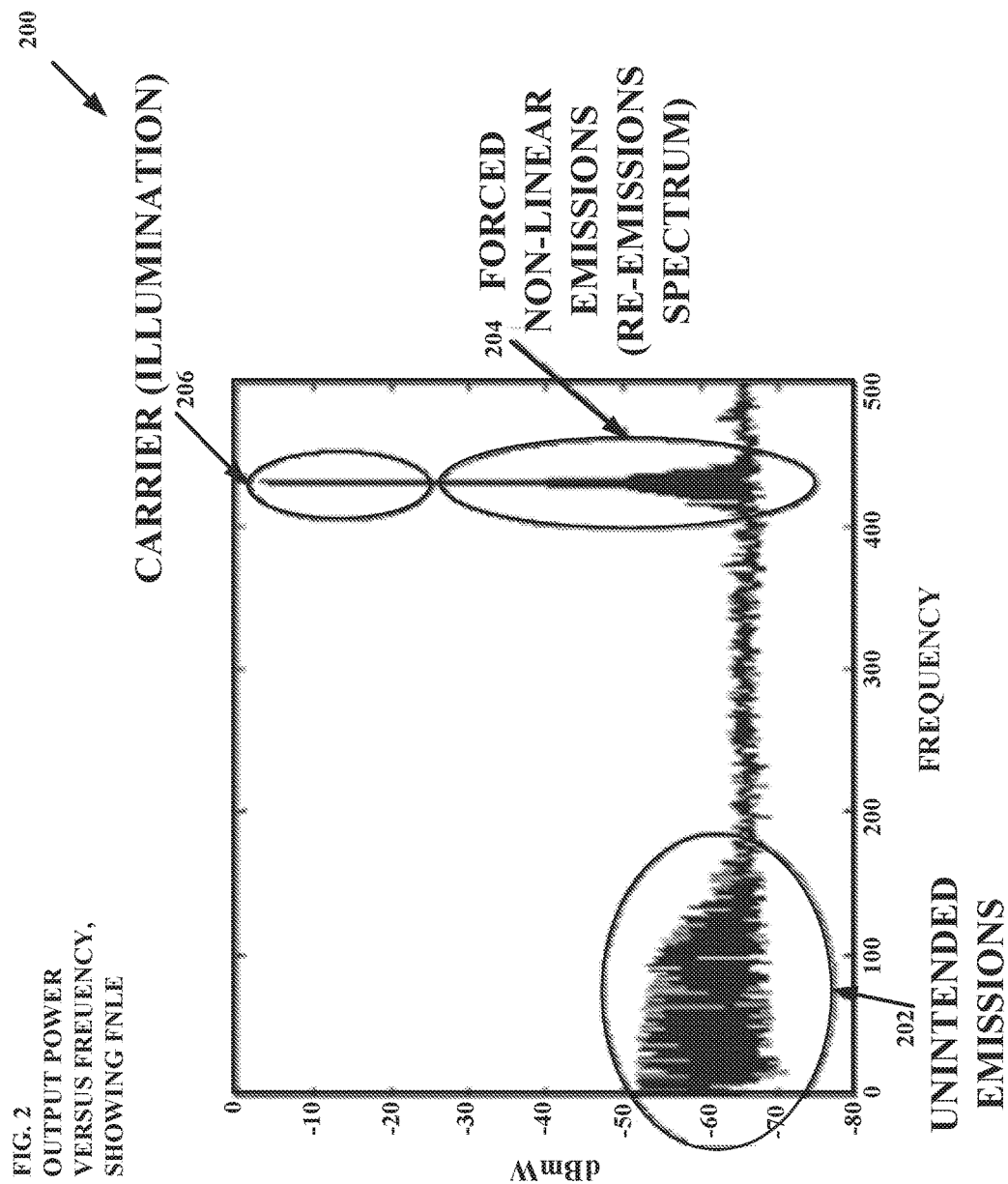
FIG. 2 shows an example of a spectrum 200 of emitted electromagnetic power versus frequency emitted by a target device in accordance with some embodiments.

FIG. 2 shows an example of a spectrum 200 of emitted electromagnetic power versus frequency emitted by a target device in accordance with some embodiments. At the lower end of the frequency range, a variety of unintended emissions 202 are shown. Digital devices of all types emit unintentional RF. When illuminated with RF energy, electronic devices may emit forced non-linear emissions (FNLE), also described as the re-emission spectrum 204. The non-linear emissions 204 are the result of superheterodyne-like mixing of normal operating signals with the externally applied illumination. The large peak shown represents the carrier wave 206 of the intentional illumination signal. Around the large peak, the re-emission spectrum of the forced non-linear emissions 204 is shown. In general, the re-emission spectrum 204 manifests as sidebands around a carrier frequency, and is largely dependent upon the physical characteristics of the target device 100 (e.g., its hardware, software, and operating state). The re-emission spectrum 204 may contain considerable information about the interaction of the illuminating RF energy and the target device 100.

The examples provided may illuminate a target device or system under test (SUT) 100 with RF waveforms swept across a broad range of frequencies. Illuminating a SUT generates mixed signal products, e.g., signals resulting from the combination of the illumination signal and existing on-board SUT signals. This mixing provides unique signal characterization opportunities that may be exploited by several exemplary and non-limiting embodiments. These opportunities may include:

Increased signal detection range: Illumination may provide a carrier signal that mixes with signals present in the target system. This interaction may produce a mixed signal, an FNLE 204, with improved signal strength that can be detected at a greater range. Experimental tests suggest that a gain of 50 dB may be expected over emissions occurring without illumination. The corresponding improvement in signal-to-noise ratio enables remote sensing improvement goals in various environments. Further, in one example, the forced non-linear emissions 204 may radiate from the target system 100 via an antenna of the target system 100, further increasing the detection range for a given illumination power. The frequency of the illumination energy may be configured to avoid interference with signals that radiate from the target system antenna during normal operation of the target system 100. However, the scope of this disclosure is not limited in this respect.

Increased signal fidelity: Illumination mixing produces a host of new FNLE 204 at new frequencies. These emissions are probably unanticipated by the target system's designers and are thus unlikely to be RF shielded or suppressed. The effects of illumination may therefore provide a broader, more complex set of signals for analysis. This wider range of signal information about the target system 100 may aid in the characterization of the target system 100.

Increased information content on the SUT's operational state: The cross modulation and intermodulation products within the FNLE 204 generated may have their origins in many parts of the SUT 100. Examples include but are not limited to mixed signals due to clock transitions, FM signals produced by mixing with data on memory and address busses, induced non-linear signals with complex harmonic structures caused by changing the operating regime of semiconductors, and mixing products generated by systems on a chip. All of these may produce signatures that when combined denote characteristics underlying the operation of the SUT 100, e.g., its presence or a count of multiple target devices present, and its "health" or conformance to desired operational behaviors. It may also be possible to discern the presence of a number of particular instances of a component in the target device 100, enabling inventory control and situational awareness through a survey of detected devices. The signal data generated by for example software defined radio (SDR) based test pods may be analyzed using non-linear classification and data mining methods to exploit the complex nature of the signal features (e.g., phase and harmonic structures) to characterize SUT 100 operations. The additional signal content available from FNLE 204 may enable desired classification accuracy.

General operational applicability: The excitation mechanism and receivers in one exemplary implementation are an SDR system. SDRs may automatically illuminate SUTs at multiple frequencies and waveforms to characterize and analyze the operation of the SUT. That is, multiple illumination signals may be applied simultaneously to induce multiple forced non-linear emissions 204. However, the disclosure is not limited in this respect.

The disclosed examples may form the basis of a new security/monitoring capability for protecting IoT (internet of things) circuits or similar devices by monitoring their behavior at a physical level from a standoff distance. They may also form the basis of a counterfeit detection capability or erroneous operation capability for aircraft, ships, land vehicles, or other platforms. The examples provided may also enable new methodologies for low bandwidth communication.

The externally generated illumination may also interact with unpowered target devices 100, such as data storage devices, to stimulate and mix with electromagnetic signals in the target devices. That is, even if there are normally no operational signals actively transferring data as described in the previous pc example, the illumination may nonetheless induce reflective or resonant signals within the target device 100. The mixture of these induced signals with the externally applied electromagnetic energy may produce forced non-linear emissions 204 that also radiate from the unpowered target device 100.

In an example, a software defined radio (SDR) apparatus configured to remotely and automatically detect and analyze an electronic target device may include transmitter circuitry configured to illuminate the target device with electromagnetic energy that stimulates and mixes with electromagnetic signals in the target device, to produce forced non-linear emissions that radiate from the target device, and receiver circuitry configured to receive the forced non-linear emissions from the target device for subsequent analysis and evaluation.

In an example, a method of remotely and automatically detecting and analyzing an electronic target device may include illuminating the target device using transmitter circuitry that outputs configured electromagnetic energy that stimulates and mixes with electromagnetic signals in the target device, to produce forced non-linear emissions that radiate from the target device, and receiving the forced non-linear emissions using receiver circuitry for subsequent analysis and evaluation.

In an example, a non-transitory computer-readable storage medium may store instructions for execution by processing circuitry of an SDR that remotely and automatically detects and analyzes an electronic target device, to configure the SDR to illuminate the target device using transmitter circuitry that outputs configured electromagnetic energy that stimulates and mixes with electromagnetic signals in the target device, to produce forced non-linear emissions that radiate from the target device, and to receive the forced non-linear emissions using receiver circuitry for subsequent analysis and evaluation.

Further, the illumination may be controlled to responsively move the forced non-linear emissions 204 out of a frequency range that is effectively shielded by an enclosure and into a frequency range that more readily escapes the enclosure. Transmitter circuitry may be configured to control the electromagnetic energy by varying at least one of its frequency, power, waveform, directionality, and duration for example to increase the forced non-linear emissions received. In an embodiment, the frequency ranges of the illumination that provide the clearest data for a variety of commercially available normally-unpowered target devices 100 may be determined a priori and stored for use as default settings. Then, when an in situ scan is performed, those illumination frequencies may be used to cause forced non-linear emissions 204 to radiate and provide useful data for analysis from any such target devices 100 present.

The frequency ranges of the illumination that provide the clearest data may also be determined automatically during a scan. If target devices 100 are hidden or concealed from view, for example within furniture or in cluttered environments, the illumination may be modified to nonetheless cause clearly discernible forced non-linear emissions 204 that radiate through intervening materials sufficiently for adequate reception and analysis. Other aspects of the applied electromagnetic energy may also be varied to adapt the system to the local environment, such as its power and directionality as previously noted.

Processing circuitry configured to perform the analysis and evaluation of the forced non-linear emissions 204 may also locate such hidden target devices 100. The strength and directionality of the emissions for example may help guide a user to the target devices 100. In one embodiment, a smartphone application may process the forced non-linear emissions 204 to provide a map of the emission sources based on their strength and directionality.

Such a map may be dynamically overlaid onto a conventional camera-acquired image of a room or other location being scanned for example, to visually highlight the radiative signal sources. Thus, the embodiments described may greatly improve the speed and thoroughness of what has previously been a visual and manual search process. This automated approach to target device 100 detection, location, and identification may reduce the likelihood of human error during a search.

Figure 3:
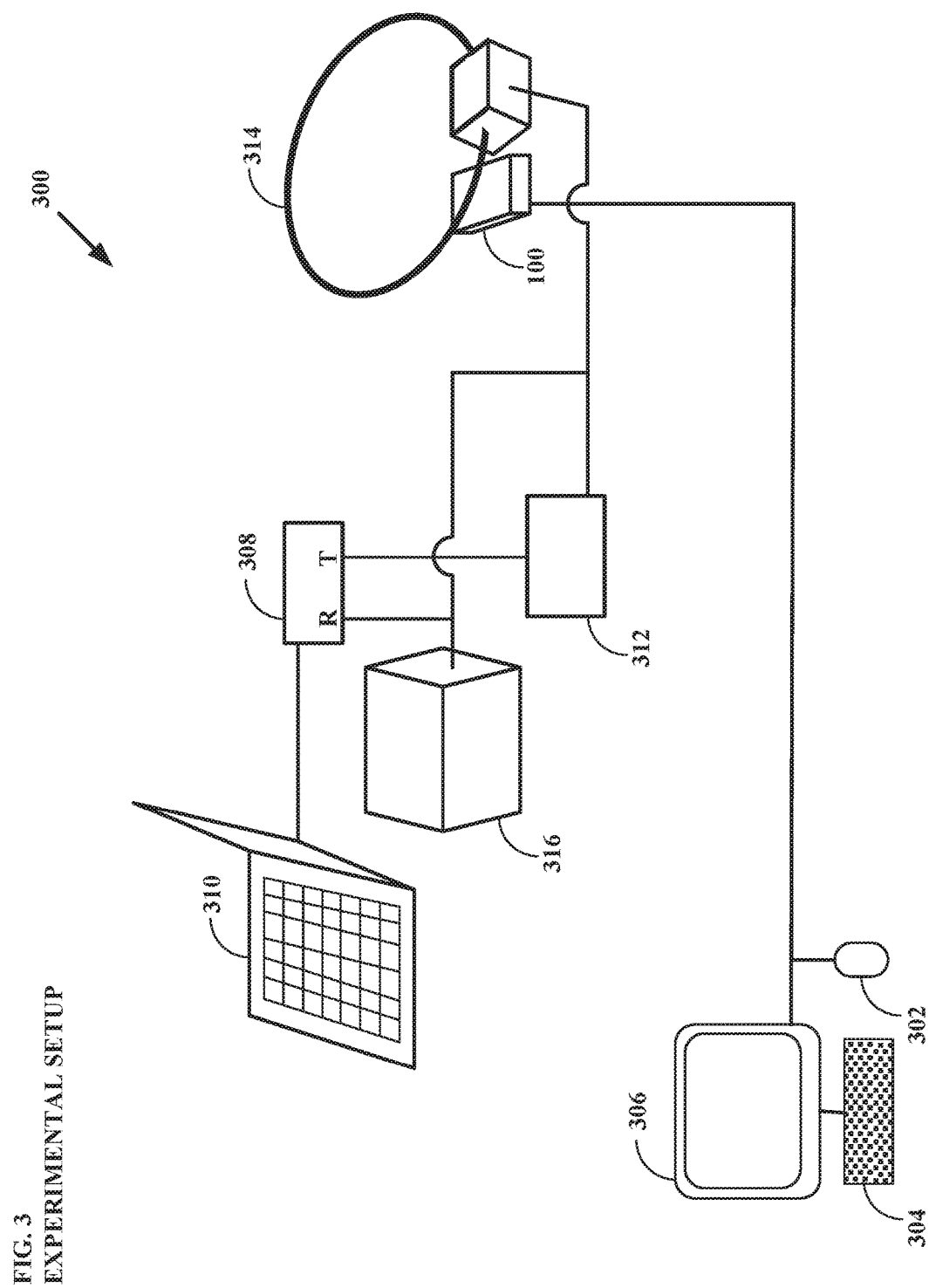
FIG. 3 shows an example of a forced non-linear emission apparatus 300 in accordance with some embodiments.

FIG. 3 shows an example of a forced non-linear emission apparatus 300 in accordance with some embodiments. An initial implementation has demonstrated the concept has been reduced to practice. In this example, the target device is a Raspberry Pi® microcomputer, available from the Raspberry Pi Foundation. A mouse 302, keyboard 304, and monitor 306 are connected to the target device 100 to enable a user to control its operations.

A typical illumination apparatus may comprise one or more RF emitters or transmitter circuits positioned at some distance from the target devices 100. The distance from the target devices 100 may be fixed or variable, enabling operation on a moving platform based on air, sea, or land. Increased proximity to the target devices 100 may reduce a required illumination power. One or more RF receiver circuits may also be placed at a distance. Receivers may be placed farther away from the target devices 100 than the emitters.

In this example, the receiver circuit and transmitter circuit comprise a software-defined radio transceiver 308, which is capable of operation from 70 MHz to 6 GHz. The transceiver 308 may be controlled for example by a laptop computer 310 that executes a software-defined radio program with an AM demodulator. The output from the transceiver 308 may be fed into a frequency shifter 312, that may for example shift the transmitted signal upward in frequency by 125 MHz to produce an illumination signal. The illumination signal in this example drives a loop antenna 314, which may be driven directly as a transmitting antenna and also tuned over a receiving frequency range of 650 kHz to 4.8 MHz by loop antenna tuning capacitor 316 to serve as a receiving antenna, for simplicity. The loop antenna 314 is shown suspended over the target device 100 by several inches, but the disclosure is not limited in this respect.

A production version of the apparatus 300 may be battery operated and portable, so that a single person may readily transport and deploy it as a single "black box" in essentially any environment. Typical users may comprise military, security, or intelligence personnel.

In another example. Special Forces operators may be assigned to locate and seize small, possibly hidden, and possibly unpowered electronic devices during a covert mission. Such users may deploy the apparatus 300 in a terrorist compound or other tactical environment, to sweep the location with electromagnetic energy to assist with the search for an adversary's target devices 100. At present, such searches are generally manual and visual, and therefore time-consuming, risky, and haphazard.

In modern anti-terrorist or other security operations, soldiers are often asked to not only find target devices 100 by hand, but to also simultaneously protect themselves and their units from enemy fire. The apparatus 300 may therefore automatically scan the area with RF energy in spectra known or adaptively determined to cause forced non-linear emissions 204 from target devices 100. The apparatus 300 may operate without significant delay, while the soldier maintains the security of the area.

The apparatus 300 may report "hits" or target device 100 search results to a tactical controller or to an intelligence tool carried by the user, such as a smartphone application. Fast, automatic detection, location, and identification of target devices 100 allows soldiers to be faster and more thorough in their searching. Embodiments therefore enable soldiers to carry out their missions and remove even deliberately hidden items from potentially hostile locations more quickly, safely, and reliably.

Illumination by one or more RF illuminators (including possible simultaneous illumination) may occur across a range waveforms including but not limited to frequencies of 100 MHz to ten GHz for example. The illumination frequency may vary incrementally at a predetermined step rate, such as in ten kHz steps. In addition to the frequency, other waveform parameters such as continuous or pulsed illumination type, repetition rate, duration, and power may be selected. Illumination with each waveform may occur for approximately two seconds for example, but could occur for shorter or longer times depending on the target devices 100 and the geometric configuration of the RF illuminators/receivers. If a specific waveform appropriate for the target devices 100 is known, then those waveforms may be used instead of a sweep.

Approximately simultaneously with illumination, the receiving antennas may be receiving the forced emissions 204 comprising the carrier waveform, sidebands, and other frequencies resulting from penetration by the illumination waveform(s) into the target devices 100, non-linear mixing in the target devices 100, and re-emission from the target devices 100 to the receiver circuit. Depending on the type of target device 100 and the waveform properties, the re-emission may be enhanced by on-device antenna structures to enable reception of the re-emissions 204 from a greater distance than re-emissions from a target device without an antenna. The received re-emission signals 204 may be collected over both a range of frequencies and time. Time may range from sub-millisecond spans to days, for example.

The received signals may be analyzed to extract target device 100 information. Applicable analysis technique examples may include analysis of the re-emission spectrum 204, spectrum variation over time, and calculation of cross-modulation products and/or third-order intermodulation products. From these techniques, various properties of the target devices 100 may be assessed, such as state, activity, behavior, physical characteristics, or other observed phenomena. The return spectra may for example also be used to adaptively control the illumination based on the obtained target device 100 information. In an example, the illumination frequency may be changed for forced non-linear responses 204 to avoid interference with normal target device 100 emissions. However, the disclosure is not limited in this respect.

The illuminating energy characteristics may also be changed to shift the forced non-linear responses 204 to avoid interference with particular frequency ranges, or for other reasons. For example, some frequencies may be known to be used by military, intelligence, or security personnel for tactical communications. It is therefore desirable for neither the illuminating energy nor the forced non-linear responses 204 to cause communications problems.

In another example, some frequencies may be used by other security equipment, such as to detect movement within a room or other location. Illuminating energy of a particular frequency may therefore trip an alarm. Similarly, the hostile forces may use known frequency ranges for their own communications. In any case, the transmitting circuitry may configure the illuminating electromagnetic energy by varying at least one of its frequency, power, waveform, directionality, and duration, to minimize interference and/or the possibility of detection.

In one embodiment, the apparatus 300 may determine if the transmitted electromagnetic energy and/or the forced non-linear emissions 204 are within selected frequency ranges. If so, the apparatus 300 may responsively reconfigure the transmitted electromagnetic energy to shift the illumination and/or the forced non-linear emissions 204 away from the selected frequency ranges.

Further, processing circuitry configured to control the electromagnetic energy may vary at least one of its frequency, power, waveform, directionality, and duration to avoid affecting data stored in the target device 100. Non-destructive illumination power levels may preserve the intelligence value of seized target devices 100. Tests on widely available data storage devices may for example determine the maximum tolerable power density for different illumination frequencies, which may depend on the particular reflective and resonance characteristics of different types of target devices 100.

Figure 4:
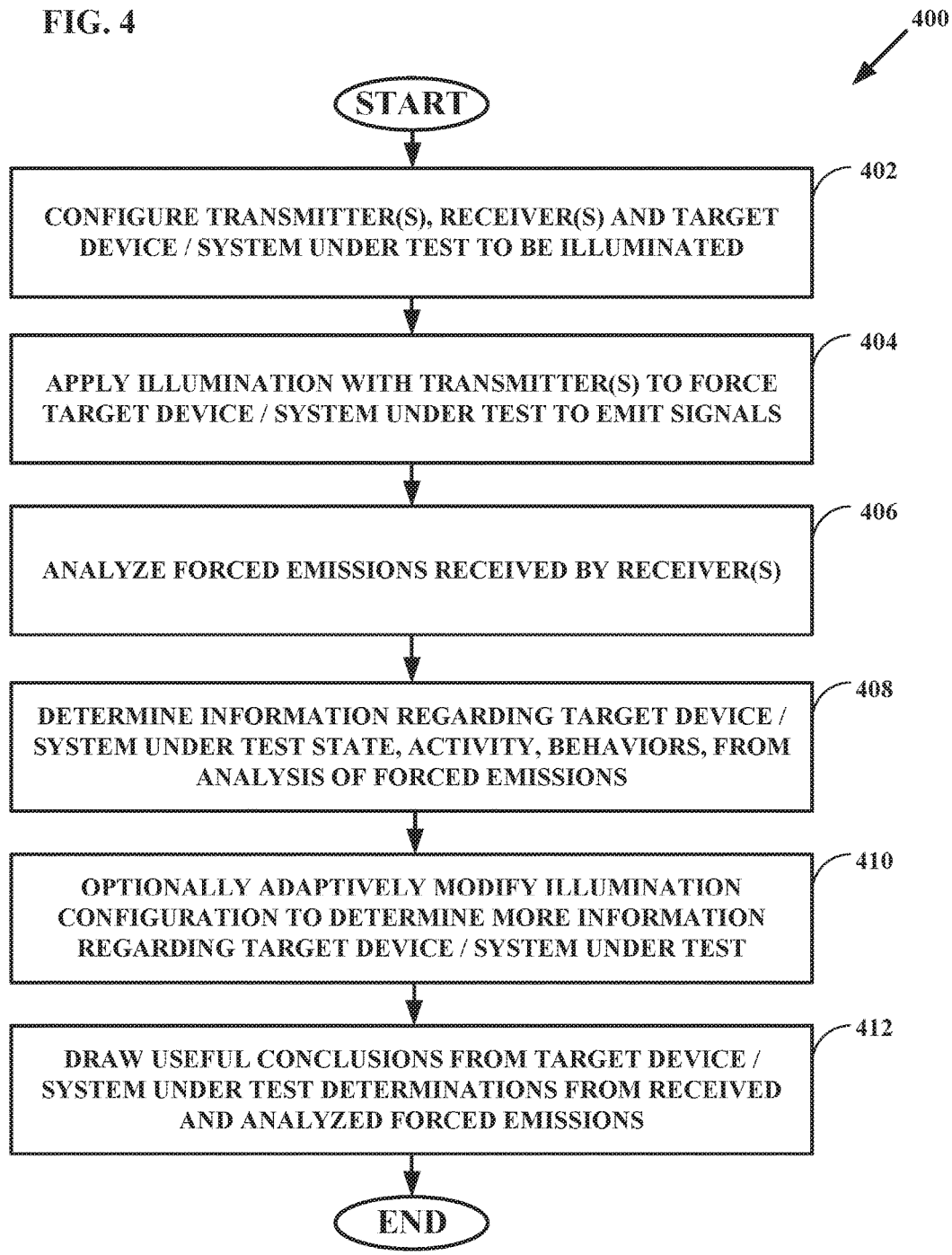
FIG. 4 shows an example of a forced non-linear emission method 400 in accordance with some embodiments.

FIG. 4 shows an example of a forced non-linear emission method 400 in accordance with some embodiments. At 402 the method may configure the transmitter circuits, receiver circuits, and the electromagnetic energy to be transmitted to the target device 100. For example, a user may define an output power, frequency range, sweep parameters, etc. to tailor the illumination to a given target device 100. At 404, the method may apply the illumination using the transmitter circuits to force the target device 100 to emit non-linear signals 204 resulting from the mixing of the illumination as previously described. At 406, the method may receive the forced non-linear emissions 204 with the receiver circuits and analyze these emissions using a variety of analytical techniques. At 408, the method may determine useful information regarding the target device 100 from the analysis of the forced non-linear emissions 204. The information may for example describe the state, behavior, and characteristics of the target device 100. At 410, the method may, optionally, adaptively modify the illumination configuration to determine more information regarding the target device 100. For example, output power, illumination type (continuous or pulsed), and frequency values or sweep ranges may be altered in response to the analysis of previously applied illumination. At 412, the method may draw useful conclusions regarding the target device 100 from the received and analyzed forced non-linear emissions 204. For example, it may be determined that the target device 100 is active and is processing data, or it may be determined that the target device 100 is currently inoperative.

In one example, the systems and methods described above may enable a rapid validation that the avionics systems in an aircraft cockpit are operating in a known state. During an initialization phase, an illumination/receiving system (also generally termed an FNLE system in this description) may be positioned at a reproducible location in the cockpit when selected avionics systems are operating in a known state. This may for example be just after maintenance and verification of the known state via a direct viewing of the avionics system's control panel. In one example, the reproducible location may be the head rest of the pilot's seat. The FNLE system may illuminate the cockpit when the cockpit is closed, and receive the forced non-linear emissions as previously described. The FNLE system may create and record a "known good set" of results, and save this baseline of the SUT as a future reference point. The baseline may be recorded both for a given type of aircraft and for the specific airframe being tested.

The FNLE system may be placed back into the cockpit at the reproducible location when aircraft operational verification is desired, such as just prior to flight for example. The cockpit may be emptied and the FNLE system triggered to illuminate the environment and record the forced emissions over a period of perhaps one or two minutes. Note, the cockpit may be vacated to improve the reliability of readings and not for health and safety reasons as FNLE system may operate at low power in this scenario. The recorded results form the test set against which subsequent results may be correlated.

Next, the FNLE system or a separate verification system may perform a comparison of the test set and the known good set. The similarities and differences in the received emissions are evaluated to determine differences in the operations of the SUT. If these differences are below a threshold, the system under test is deemed to be operating properly. The FNLE system may provide the results of the comparison between the nominal operating characteristics of the system and the actual operating state.

The avionics systems maybe further verified, either automatically or manually, by repeating the exercise described above for a variety of operational states. For example, in one test the cockpit instrumentation may be illuminated and scanned when a global positioning system (GPS) is operating in an en-route or cruising mode, and then illuminated and scanned again when operating in an approach mode such as may be used during landing. The further verification methodology may exercise more of the software capabilities of the avionics system, and may provide more robust coverage of the various operating environments of particular systems, such as the GPS. The disclosure is not limited in this respect, however.

In an example, the FNLE system may provide a rapid assessment of the number and types of devices in a room. The FNLE system may first individually illuminate and scan a number of devices to form a catalog of characteristic results that may form a "reference set". Next, the FNLE system may be placed into a room and activated. The system may initially survey the room to gather observations of radio emissions prior to initializing its transmitter circuits to illuminate the room. The gathered observations may be recorded and form a "baseline set". The FNLE system may then illuminate and scan the room to form an "illumination set". The FNLE system may normalize the illumination set using the baseline set, so that the forced emissions 204 alone may be determined. The difference between the illumination set and the baseline set, due to the forced emissions 204, may form a "test set".

The FNLE system or a separate verification system may then compare the test set against the reference set to potentially recognize known target device 100 types. That is, if a match between the test set and the reference set occurs, that may indicate that a known target device 100 is present. The recognition process may be repeated until all of the forced non-linear emissions 204 have been matched with a target device 100 that is a member of the test set, or the test set has been exhausted. Remaining unidentified FNLEs may trigger an alert that at least one remaining unidentified device is present. The disclosure is not limited in this respect, however.

Similarly, a user tasked to find a particular type of target device 100 could employ the embodiments described to recognize and locate all instances of that type device via the analysis and evaluation of the various forced non-linear emissions 204 from a scan. Suppose for example that the primary target of a search is a SIM card, typically used in a cell phone. Detection of unauthorized cell phones may be very useful, for example in prisons.

Rather than visually searching an area for SIM cards, which are small and easily concealable, a user may deploy the apparatus 300 previously described to scan the area. Forced non-linear emissions 204 matching those known to radiate from SIM cards may be identified and selected for preferential presentation to the user. A smartphone application for example may indicate the direction and probable or relative range to all detected SIM cards based on the analysis and evaluation.

Figure 5:
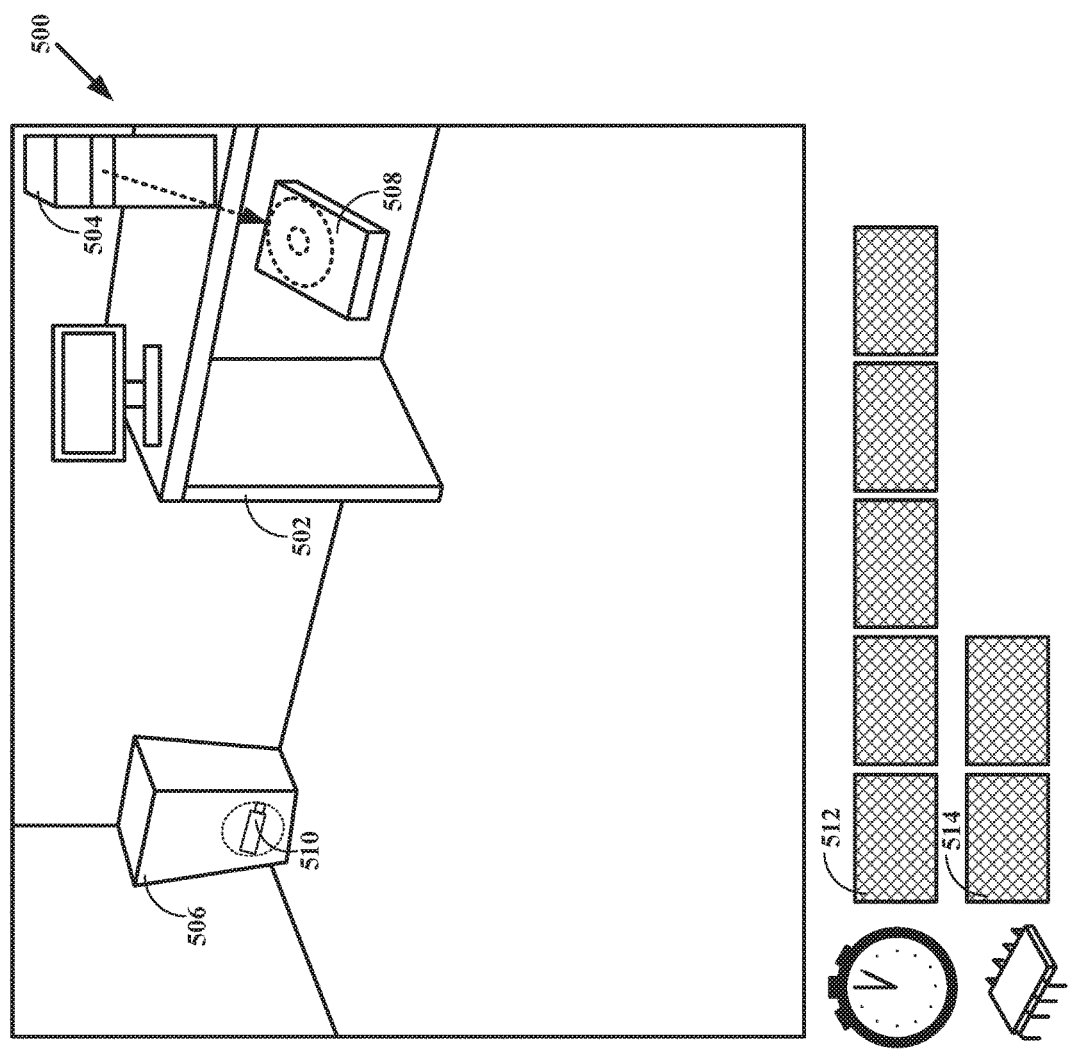
FIG. 5 shows an example of a visually scanned target device search area 500 in accordance with some embodiments.

FIG. 5 shows an example of a visually scanned target device search area 500 in accordance with some embodiments. The search area 500 may comprise a room in a terrorist compound or other area being visually searched by military, security, or intelligence personnel for example. The search area 500 may include a desk 502 with a desktop computer 504 and a garbage can 506.

The searcher may have only a very limited time to conduct a visual search and seize target devices 100 likely to be of evidentiary or intelligence value. The searcher may also be responsible for providing security during the search, and thus may only discover and seize target devices 100 that are readily recognized and located through a visual search. Such devices may comprise a hard disk drive 508 taken from the desktop computer 502, and a USB memory stick 510 hidden in the garbage can 506, for example. The overall time required for the search and the number of devices seized are indicated here via icons 512 and 514, respectively.

FIG. 6 shows an example of an electromagnetically scanned target device search area 600 in accordance with some embodiments. The search area 600 may again comprise a room in a terrorist compound or other area being searched by military, security, or intelligence personnel for example. The search area 600 may again include the desk 502 with the desktop computer 504 and the garbage can 506.

In this example however, the searcher may use the embodiments described to enhance search capabilities beyond the merely visual. The searcher may again have only a very limited time to conduct a search and seize target devices 100 likely to be of evidentiary or intelligence value. While target devices 100 such as the hard disk drive 508 from the desktop computer 502 and the USB memory stick 510 were readily discernible in a visual or manual search, other items of interest were not.

Additional target devices 100 may be rapidly found by scanning the search area 600 with illuminating electromagnetic energy and analyzing and evaluating the forced non-linear emissions as previously described. For example, the searcher may also detect and locate target devices 100 such as a SIM card in a hidden cell phone 602 embedded in a wall, and an SD card 604 taped to the underside of the desk 502. The overall time required for the search and the number of devices seized are indicated here via icons 612 and 614, respectively. The end result may be that more target devices 100 may be found in less time.

FIG. 7 shows a further example of a forced non-linear emission method 700 in accordance with some embodiments. At 702 the method may configure the transmitter circuits, receiver circuits, and the electromagnetic energy to be transmitted to the target device 100. For example, a user may define an output power, frequency range, sweep parameters, etc., to tailor the illumination to a given target device 100 so that it will stimulate and mix with electromagnetic signals in the target device 100. That is, differently configured illumination may be used for unpowered target devices 100 that lack operational signals, compared with the illumination of powered target devices 100 previously described.

The target devices 100 may comprise data storage devices, such as a SIM card, a USB memory stick, a flash memory, or an SD card. The illumination may configure the illuminating electromagnetic energy to avoid affecting data stored in the target device 100. For example, the peak power density may be limited to prevent alteration of stored data.

At 704, the method may apply the illumination using the transmitter circuits to force the target device 100 to emit non-linear signals 204 resulting from the mixing of the illumination as previously described. In this example however, the transmitter circuits may control the electromagnetic energy to configure a frequency range of the forced non-linear emissions 204 to better radiate from an enclosure containing the target device 100. A plurality of transmitters in the transmitter circuitry may be inter-networked to increase the overall target device 100 detection area and the reception of the forced non-linear emissions 204.

At 706, the method may receive the forced non-linear emissions 204 with the receiver circuits and analyze these emissions using a variety of analytical techniques. At 708, the method may determine useful information regarding the target device 100 from the analysis of the forced non-linear emissions 204. The information may for example describe the state, behavior, and characteristics of the target device 100. Processing circuitry may determine a target device 100 type from among known types by comparing a reference evaluation of a reference device of known type with the in situ evaluation of the target device 100. The processing circuitry may also locate a hidden target device 100 based on the strength and originating direction of the forced non-linear emissions 204.

At 710, the method may control the electromagnetic energy to keep the electromagnetic energy and the forced non-linear emissions out of selected frequency ranges. The selected frequency ranges may be those used for tactical communications by search personnel or enemy forces. The selected frequency ranges may also be those used for other security equipment. The method may, optionally, adaptively modify the illumination configuration upon a determination that the electromagnetic energy or the forced non-linear emissions 204 are within the selected frequency ranges. Processing circuitry may shift the electromagnetic energy and the forced non-linear emissions 204 away from the selected frequency ranges by responsively reconfiguring the illumination. For example, output power, illumination type (continuous or pulsed), and frequency values or sweep ranges may be dynamically altered in response to the analysis of previously applied illumination.

At 412, the method may draw useful conclusions regarding the target device 100 from the received and analyzed forced non-linear emissions 204. For example, it may be determined that the target device 100 is active and is processing data, or it may be determined that the target device 100 is currently inoperative as is often the case with non-volatile data storage devices 100, such as those based on flash memory technologies. The conclusions may be presented to a searcher, for example via a smartphone application, to provide a faster, safer, and more thorough search capability.

In an example, the forced non-linear emissions 204 may enable detection of counterfeit target devices 100. The forced emissions 204 may vary according to the type of target device 100 and its particular components, the software it is running, and even by the particular data it is internally exchanging. The FNLE system may therefore illuminate and scan a reference target device 100 that is well characterized as comprising particular subsystems or components, running particular software, and exchanging particular data, to produce a very particular reference set for comparison. Thus the very specific returned emissions corresponding to a precise set of operational circumstances and hardware may serve as a 'fingerprint' for a particular target device 100 or nearly identical duplicate. If an illuminated and scanned target device does not yield results that match the reference set, then the target device 100 is very probably not the expected device. The disclosure is not limited in this respect, however.

In an example, the specific characterization of a target device 100 according to its forced non-linear emissions 204 may enable reverse engineering of the target device 100. That is, the specific components, software, and even data of the target device 100 may be discerned through external examination with a FNLE system without requiring direct physical access to the integrated circuits involved. The FNLE system may identify "pin compatible" systems, component devices, and data that may not be identifiable without directly probing an IC die for example. The disclosure is not limited in this respect, however.

In an example, a FNLE system that receives information from a target device 100 indicative of its operating status may provide continuous or nearly continuous monitoring of operations of a target device 100 in situ via a comparison of the received forced non-linear emissions 204 to an acceptable baseline. This approach has the advantage that there is no need for physical (e.g., optical, electrical, or even radio) connection as intended by the target device's designers. The lack of connection means that the systems under test 100 are isolated from attack, such as a cyber attack, but their operations may still be monitored via their forced non-linear emissions 204. This capability may be particularly useful for SUTs 100 that require high degrees of protection, are legacy systems without communications capabilities, or are systems that lack the capability to provide status information for example. When a system under test 100 behaves in an anomalous manner, the induced non-linear emissions 204 will generally change. The FNLE system may detect and classify such change.

The simplest classification is that the system under test 100 is either behaving normally or abnormally. In a more complex classification regime, the system under test 100 may be characterized as being in several predetermined conditions. For example, a target device 100 may be characterized as in a normal state, a restarting state, or in a state of exception processing. The FNLE system may examine the induced emissions 204 and determine if the target device 100 is running normally, is restarting, or is dealing with a fault. The FNLE system may identify the system under test 100 as being in a failed or unreliable state if the SUT 100 is in none of the pre-characterized states. The FNLE systems and methods described are thus means for gathering health and status information on target devices 100. The disclosure is not limited in this respect, however.

In an example, the forced non-linear emissions 204 may serve as intentional low data rate signals from a target device 100 in a particular operating regime. That is, a target device 100 may perform operations that are known to be identifiable to a FNLE system, to communicate particular status messages. The status messages may for example be simple heartbeat indicia or other predetermined indicia intended to convey predetermined meanings to a FNLE-based monitor that characterizes the emissions that it induces and receives. A FNLE system may also assemble a number of such status messages for example to provide a more complete data transmission system. This process is somewhat analogous to sending messages via Morse code. The target device 100 may send such messages surreptitiously. When the system under test 100 is placed in the operational state associated with each symbol for example of a message to be transmitted, the FNLE system may recognize the state and provide the appropriate output to convey the intended symbol and/or its associated meaning. The assembled message for example may comprise textual information on SUT 100 status, such as "Running Normally", "System Running Hot", "Power Low", etc. In a more complex example, the FNLE system may present the output of the FNLE-encoded data and pass it on for further processing. The disclosure is not limited in this respect, however.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the some embodiments can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel". "perpendicular". "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the embodiments should be determined with reference to the appended claims, along with the full scope of equivalents to which such claims are entitled.

The invention claimed is:

1. A software defined radio (SDR) apparatus configured for remote detection and analysis of a target device, the apparatus comprising:
transmitter circuitry configured to illuminate the target device with electromagnetic energy, the electromagnetic energy configured to stimulate electromagnetic signals in the target device, the stimulated electromagnetic signals in the target device configured to mix with the electromagnetic energy to produce forced non-linear emissions (FNLE) that radiate from the target device;
receiver circuitry configured to receive the forced non-linear emissions from the target device; and
processing circuitry to determine, based on the received FNLE, a target device type from among known types by comparing a reference evaluation of a reference device of known type with an in-situ evaluation of the target device, the reference evaluation including FNLE profiles of the reference device.

2. The apparatus of claim 1, further comprising the processing circuitry configured to control the electromagnetic energy emitted from a transmitter in the transmitter circuitry, the transmitter configured to control the electromagnetic energy by varying at least one of its frequency, power, waveform, directionality, and duration, to configure a frequency range of the forced non-linear emissions to increase the FNLE radiating from an enclosure containing the target device.

3. The apparatus of claim 1, further comprising the processing circuitry configured to locate the target device based on a strength and a direction of a determined origin of the FNLE.

4. The apparatus of claim 1, wherein the target device type comprises a data storage device.

5. The apparatus of claim 4, further comprising the processing circuitry configured to control the electromagnetic energy by varying at least one of its frequency, power, waveform, directionality, and duration, to avoid affecting data stored in the target device.

6. The apparatus of claim 4, wherein the target device type comprises at least one of a subscriber identification module (SIM) card, a universal serial bus (USB) memory stick, a flash memory, and a secure digital (SD) card.

7. The apparatus of claim 1, further comprising the processing circuitry configured to control the electromagnetic energy to keep the electromagnetic energy and the forced non-linear emissions out of selected frequency ranges, including predetermined frequency ranges used for tactical communication.

8. The apparatus of claim 7, further comprising:
determining if the electromagnetic energy and the (FNLE) are within the selected frequency ranges; and
responsively reconfiguring the electromagnetic energy to shift the electromagnetic energy and the (FNLE) away from the selected frequency ranges.

9. The apparatus of claim 1, wherein the apparatus is portable and battery powered.

10. A method of remotely detecting and analyzing a target device, the method comprising:
illuminating the target device using transmitter circuitry that outputs configured electromagnetic energy that stimulates electromagnetic signals in the target device, the stimulated electromagnetic signals in the target device configured to mix with the electromagnetic energy to produce forced non-linear emissions (FNLE) that radiate from the target device;
receiving the FNLE from the target device using receiver circuitry; and
determining, by processing circuitry and based on the received FNLE, a target device type from among known types by comparing a reference evaluation of a reference device of known type with an in-situ evaluation of the target device, the reference evaluation including an FNLE profile of the reference device.

11. The method of claim 10, further comprising controlling the electromagnetic energy, using a transmitter in the transmitter circuitry, by varying at least one of its frequency, power, waveform, directionality, and duration, to configure a frequency range of the FNLE to increase the FNLE radiating from an enclosure containing the target device.

12. The method of claim 10, further comprising, using the processing circuitry configured to control the electromagnetic energy emitted from a plurality of transmitters in the transmitter circuitry, increasing the target device detection area and the reception of the FNLE.

13. A non-transitory computer-readable storage medium that stores instructions for execution by processing circuitry of a software defined radio (SDR) that remotely detects and analyzes a target device, to configure the SDR to:
illuminate the target device using transmitter circuitry that outputs configured electromagnetic energy that stimulates electromagnetic signals in the target device, the stimulated electromagnetic signals in the target device configured to mix with the electromagnetic energy to produce forced non-linear emissions (FNLE) that radiate from the target device;
receive the FNLE from the target device using receiver circuitry; and
determine, based on the received FNLE, a target device type from among known types by comparing a reference evaluation of a reference device of known type with an in-situ evaluation of the target device, the reference evaluation including an FNLE profile of the reference device.

14. The medium of claim 13, further comprising instructions that locate the target device based on a strength and a direction of an origin of the FNLE.

15. The medium of claim 13, wherein the target device comprises an unpowered data storage device comprising at least one of a subscriber identification module (SIM) card, a universal serial bus (USB) memory stick, a flash memory, and an secure digital (SD) card, and wherein the transmitter circuitry controls at least one of electromagnetic energy frequency, power, waveform, directionality, and duration, such that data stored in the target device is unaffected by the illumination.

16. The medium of claim 13, further comprising:
determining if the electromagnetic energy and the FNLE are within selected frequency ranges, including predetermined frequency ranges used for tactical communication; and
responsively reconfiguring the electromagnetic energy to shift the electromagnetic energy and the FNLE away from the selected frequency ranges.

17. The medium of claim 13, wherein the electromagnetic energy comprises radio frequency energy.

\* \* \* \* \*